United States Patent
Ng

(10) Patent No.: US 9,212,695 B2
(45) Date of Patent: Dec. 15, 2015

(54) HYBRID CLAM-SHELL LINEAR BEARING

(75) Inventor: Alison Ng, New York, NY (US)

(73) Assignee: Thomson Industries Inc., Amherst, NY (US)

( * ) Notice: Subject to any disclaimer, the term of this patent is extended or adjusted under 35 U.S.C. 154(b) by 0 days.

(21) Appl. No.: 13/485,070

(22) Filed: May 31, 2012

(65) Prior Publication Data

US 2013/0142460 A1 Jun. 6, 2013

Related U.S. Application Data

(60) Provisional application No. 61/492,106, filed on Jun. 1, 2011.

(51) Int. Cl.
*F16C 31/02* (2006.01)
*F16C 31/06* (2006.01)
*F16C 29/12* (2006.01)
(Continued)

(52) U.S. Cl.
CPC ............... *F16C 29/04* (2013.01); *F16C 29/007* (2013.01); *F16C 29/06* (2013.01); *F16C 29/069* (2013.01); *F16C 29/0616* (2013.01); *F16C 29/0683* (2013.01); *F16C 29/126* (2013.01); *F16C 31/00* (2013.01); *F16C 31/02* (2013.01); *F16C 31/06* (2013.01)

(58) Field of Classification Search
CPC .......... F16C 21/00; F16C 31/02; F16C 31/04; F16C 31/06; F16C 31/00; F16C 29/045; F16C 29/046; F16C 29/06; F16C 29/0604; F16C 29/0607; F16C 29/0611; F16C 29/0676; F16C 29/068; F16C 29/0683; F16C 29/0685; F16C 29/0688; F16C 29/069; F16C 29/0602

USPC ....................... 384/26–43, 45, 49, 50, 126, 25
See application file for complete search history.

(56) References Cited

U.S. PATENT DOCUMENTS 3,144,279 A * 8/1964 Smith ........................... 384/126
4,311,348 A 1/1982 Olschewski et al.
(Continued)

FOREIGN PATENT DOCUMENTS

DE     34 35 595 A1     4/1986
EP     1 512 878 A1     3/2005
(Continued)

OTHER PUBLICATIONS

International Search Report and Written Opinion dated Aug. 20, 2012.

*Primary Examiner* — Alan B Waits
(74) *Attorney, Agent, or Firm* — Dilworth & Barrese, LLP.

(57) ABSTRACT

A linear motion bearing assembly includes (a) first and second interlocking bearing blocks, each having an inner wall which together define an axial space; and (b) a load bearing assembly disposed within the axial space of the interlocking bearing blocks, said load bearing assembly including first and second joinable sleeves, and at least one first load bearing structure disposed within the joined sleeves which includes an inner surface with ball bearings, and at least one second load bearing structure disposed within the joined sleeves which includes an inner low friction surface for facilitating sliding contact with a shaft, but including no ball bearings, the inner surfaces of said first and second load bearing structures together defining an axial channel through which the shaft is disposed and linearly and/or rotatably movable therein.

19 Claims, 6 Drawing Sheets

(51) Int. Cl.
*F16C 29/04* (2006.01)
*F16C 29/00* (2006.01)
*F16C 29/06* (2006.01)
*F16C 31/00* (2006.01)

(56) References Cited

U.S. PATENT DOCUMENTS

| | | | | |
|---|---|---|---|---|
| 4,480,879 A | * | 11/1984 | Reith et al. | 384/45 |
| 5,268,970 A | * | 12/1993 | Tanaka | 384/43 |
| 5,294,201 A | * | 3/1994 | Agari | 384/45 |
| 5,346,313 A | * | 9/1994 | Ng | 384/43 |
| 5,558,442 A | * | 9/1996 | Ng | 384/43 |
| 5,829,882 A | * | 11/1998 | Ng et al. | 384/43 |
| 6,113,275 A | * | 9/2000 | Blase | 384/296 |
| 7,458,158 B2 | * | 12/2008 | Luo et al. | 29/898 |
| 7,845,312 B2 | * | 12/2010 | Brown | 119/784 |
| 8,127,639 B2 | * | 3/2012 | Manwaring et al. | 74/492 |
| 2001/0033703 A1 | * | 10/2001 | Martin | 384/296 |
| 2004/0076348 A1 | | 4/2004 | Dalessandro | |
| 2011/0011200 A1 | * | 1/2011 | Pohlman et al. | 74/579 R |

FOREIGN PATENT DOCUMENTS

| | | |
|---|---|---|
| WO | 97/01713 A1 | 1/1997 |
| WO | 2012/009623 A1 | 1/2012 |

* cited by examiner

HYBRID CLAM-SHELL LINEAR BEARING

CROSS REFERENCE TO RELATED APPLICATIONS

The present application claims priority to U.S. Provisional Application No. 61/492,106 filed Jun. 1, 2011, which is herein incorporated by reference in its entirety.

FIELD OF THE INVENTION

The present disclosure relates to a linear bearing assembly.

BACKGROUND OF THE ART

In a linear motion bearing, a generally cylindrical housing is designed to move relative to a shaft. The housing includes a load bearing plate structure comprising a plurality of ball retaining segments. Each ball retaining segment includes a plurality of ball bearings moveable in a track. The segments are mounted within the housing so that movement of the housing with respect to the shaft is effectuated through engagement of the bearings with the shaft. As the housing moves, the ball bearings move in respective tracks. This disclosure describes an improvement on these prior art systems.

SUMMARY OF THE INVENTION

A linear motion bearing assembly is described herein which comprises (a) first and second interlocking bearing blocks, each having an inner wall which together define an axial space; and (b) a load bearing assembly disposed within the axial space of the interlocking bearing blocks, said load bearing assembly including first and second joinable sleeves, and at least one first load bearing structure disposed within the joined sleeves which includes an inner surface with ball bearings, and at least one second load bearing structure disposed within the joined sleeves which includes an inner low friction surface for facilitating sliding contact with a shaft, but including no ball bearings, the inner surfaces of said first and second load bearing structures together defining an axial channel through which the shaft is disposed and linearly and/or rotatably movable therein.

BRIEF DESCRIPTION OF THE DRAWINGS

The drawings constitute a part of the specification and include exemplary embodiments of the present invention and illustrate various objects and features thereof wherein.

DETAILED DESCRIPTION OF PREFERRED EMBODIMENT(S)

Figure 1:
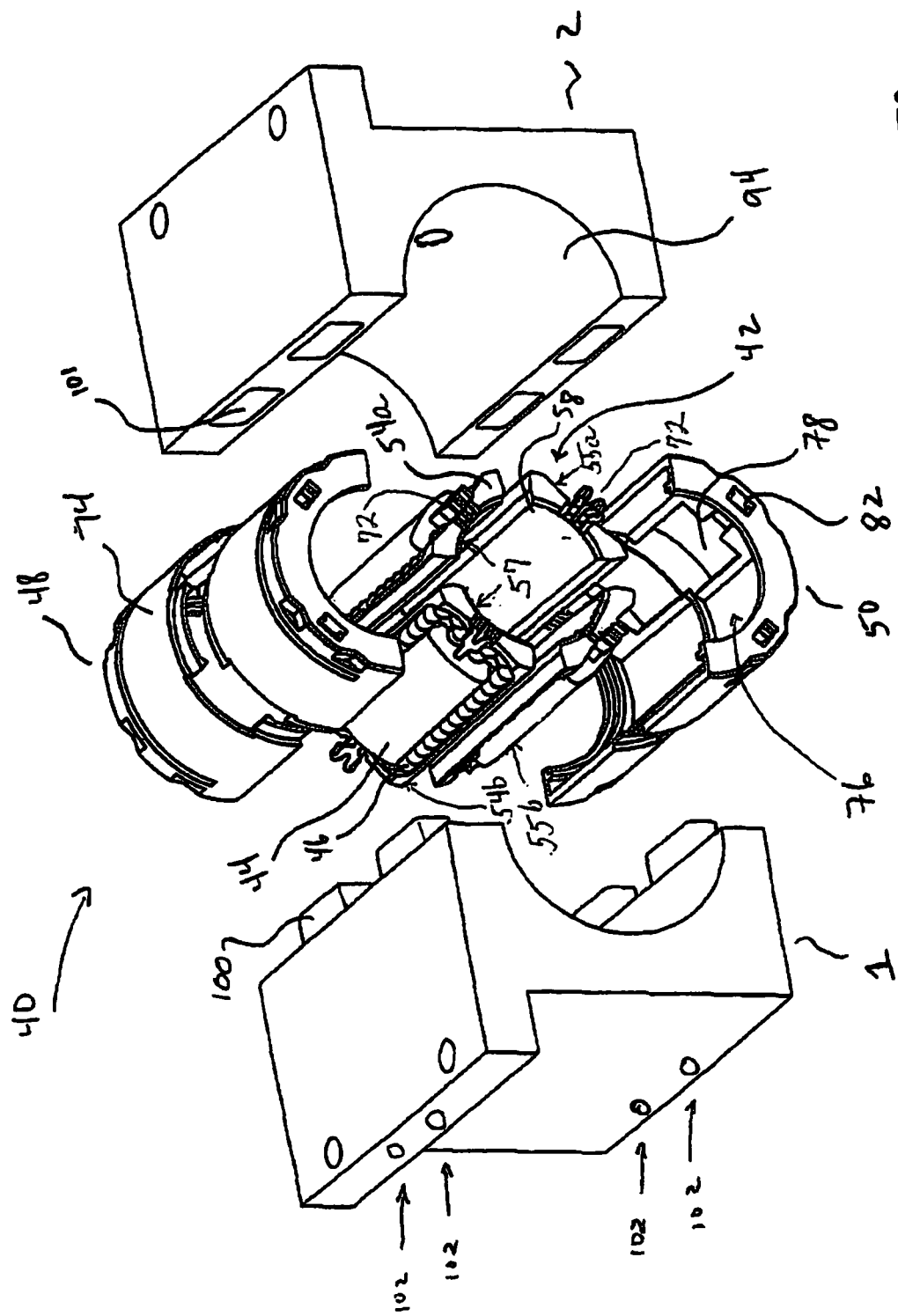
FIG. 1 is an exploded perspective view of a hybrid clam shell linear motion bearing assembly in accordance with one embodiment of the present invention.

Various embodiments are described below with reference to the drawings. Elements of like structures or function are represented with like reference numerals throughout the figures. The figures are only intended to facilitate the description of the invention or as a guide to the scope of the invention. In addition, an aspect described in conjunction with a particular embodiment of the invention is not necessarily limited to that embodiment and can be practiced in conjunction with any other embodiment of the invention.

For the purposes of this specification and appended claims, unless otherwise indicated, all numbers expressing components and sizes and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding the numerical ranges and parameters set forth herein, the broad scope of the invention are approximations, the numerical values set forth in the specific specification are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

The headings in this application are not meant to limit the disclosure in any way; embodiments under any one heading may be used in conjunction with embodiments under any other heading.

It is noted that, as used in this specification and the appended claims, the singular forms "a," "an," and "the," include plural referents unless expressly and unequivocally limited to one referent. Thus, for example, reference to "a support plate" includes one, two, three or more support plates.

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents that may be included within the invention as defined by the appended claims.

Referring initially to FIGS. 1-6, there is shown a hybrid clam shell linear motion bearing assembly 40 in accordance with a preferred embodiment of the present invention. The bearing assembly includes load bearing plate structure, load bearing plates 44, bearing balls 46, outer housing sleeves 48,50 and bearing blocks 1,2.

Figure 3:
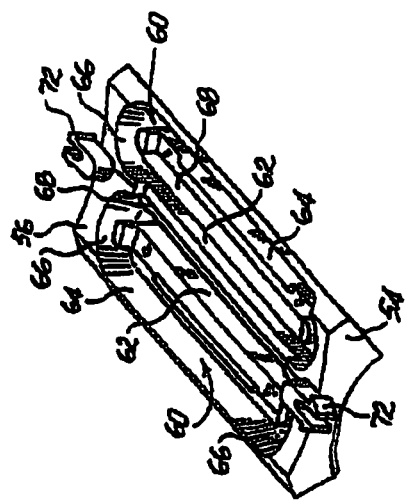
FIG. 3 is a perspective view of a ball retainer segment in accordance with the linear motion bearing assembly of FIG. 1.
Figure 2:
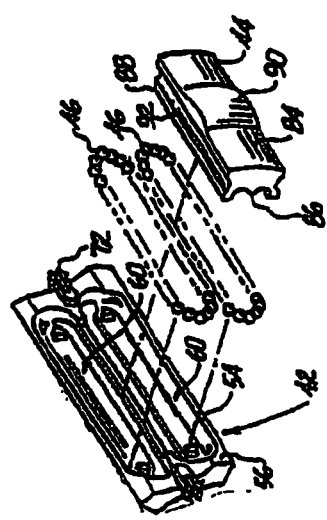
FIG. 2 is a perspective view of a ball retainer segment in accordance with the linear motion bearing assembly of FIG. 1.
Figure 5:
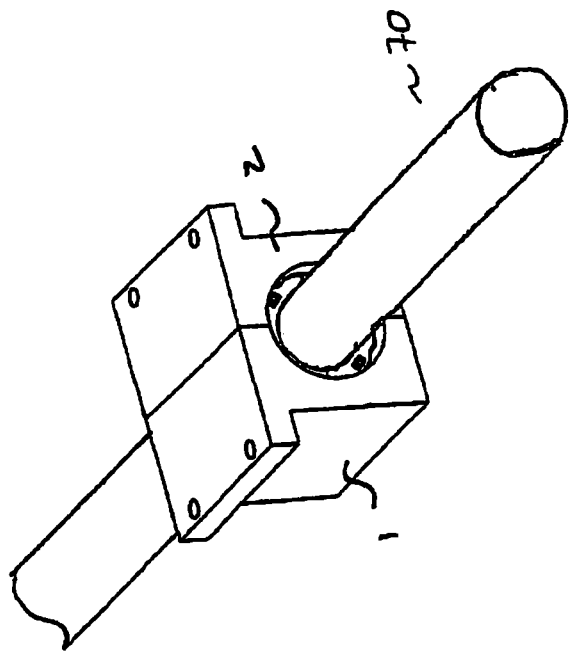
FIG. 5 is a perspective view of the hybrid clam shell linear motion bearing assembly in an assembled configuration in accordance with one embodiment of the present invention.
Figure 4:
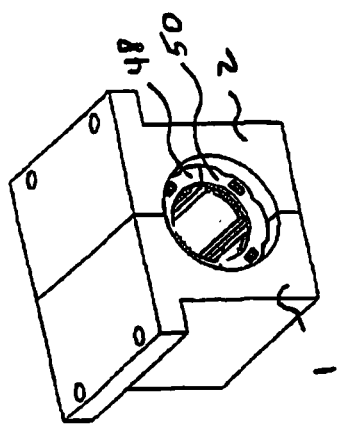
FIG. 4 is a perspective view of the hybrid clam shell linear motion bearing assembly in an assembled configuration in accordance with one embodiment of the present invention.

In FIGS. 1-5 details of the load bearing plate structures 42 are illustrated. In this embodiment of the present invention the load bearing plate structure 42 comprises two adjacent ball retainer segments 54a and 54b and two adjacent sliding contact segments 55a and 55b without rolling ball bearings, each operatively associated with adjacent segments along longitudinal sides thereof to form a polygonally shaped load bearing plate structure having a bore therethrough for receiving a shaft or rail 70 (FIG. 5). Each ball retainer segment 54a and 54b includes an outer radial surface 56 (FIG. 2) and an inner radial surface 57 (FIG. 1). Axial ball tracks 60 are formed in the outer radial surface 56 of each ball retainer segment 54a and 54b and include load bearing portions 62, return portions 64 and turnarounds 66 (FIGS. 2 and 3). The load bearing and return portions of the ball tracks in this embodiment are undercut to facilitate loading and retention of the bearing balls 46 therein. This also eliminates the need for separate retainer structure to keep the bearing balls in the ball tracks. A longitudinal bore 68 in the inner radial surface 57 of the ball retainer segments 54a and 54b extends substantially the length of the load bearing portions 62 and accesses support shaft 70 (FIG. 5). Although support shaft 70 is illustrated as a substantially cylindrical shaft, one skilled in the art will appreciate that support members of other configurations are within the scope of the invention. In this embodiment of the linear motion bearing assembly 40, the individual ball retainer segments 54a and 54b, as well as the other components of the linear motion bearing assembly 40, are easily molded from an appropriate engineering plastic using known materials and molding techniques. Suitable engineering plastics include, but are not limited to: High Density Polyethylene plastic (HDPE), Ultra high Molecular weight Polyethylene plastic (UHMWPE), MC Cast Nylon 6/66 plastic (Nylon), Polytetrafluoroethylene plastic (PTFE), Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS), and Polyoxymethylene plastic (POM/Acetal). By individually forming each of the ball retainer segments, the molding process is greatly simplified and thus results in a lower cost to produce. It is also within the scope of the present invention to fabricate the ball bearing segments and various other components from an engineering metal, such as ferrous and non ferrous alloys (e.g., stainless steel, brass, bronze, nickel alloys) as well as aluminum and titanium, using known fabrication techniques.

A plurality of bearing balls 46 are disposed in the ball tracks 60 with those bearing balls 46 in the load bearing tracks 62 extending at least partially into longitudinal bores 68 to contact support shaft 70 (FIG. 5). In this embodiment of the invention, a pair of axial ball tracks 60 is formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. Locking structure in the form of locking clips 72 are formed on opposing longitudinal ends of each ball retainer segment 54 to facilitate assembly with outer housing sleeves 48,50, discussed in greater detail hereinbelow.

The load bearing plate structure 42 described herein includes a dual track configuration for ball retainer segments 54a and 54b. Other configurations are contemplated. For example, a single track load bearing plate structure is also contemplated as described in U.S. Pat. Nos. 5,346,313 and 5,558,442, the entire disclosures of which are hereby incorporated by reference. Additional examples of other track load bearing plate structures are described in U.S. Provisional Application Ser. No. 61/364,525 the entire disclosure of which is hereby incorporated by reference. For a further example, a half bearing segment load bearing plate structure is also contemplated as described in U.S. Pat. No. 6,908,228, the entire disclosure of which is hereby incorporated by reference.

Figure 6:
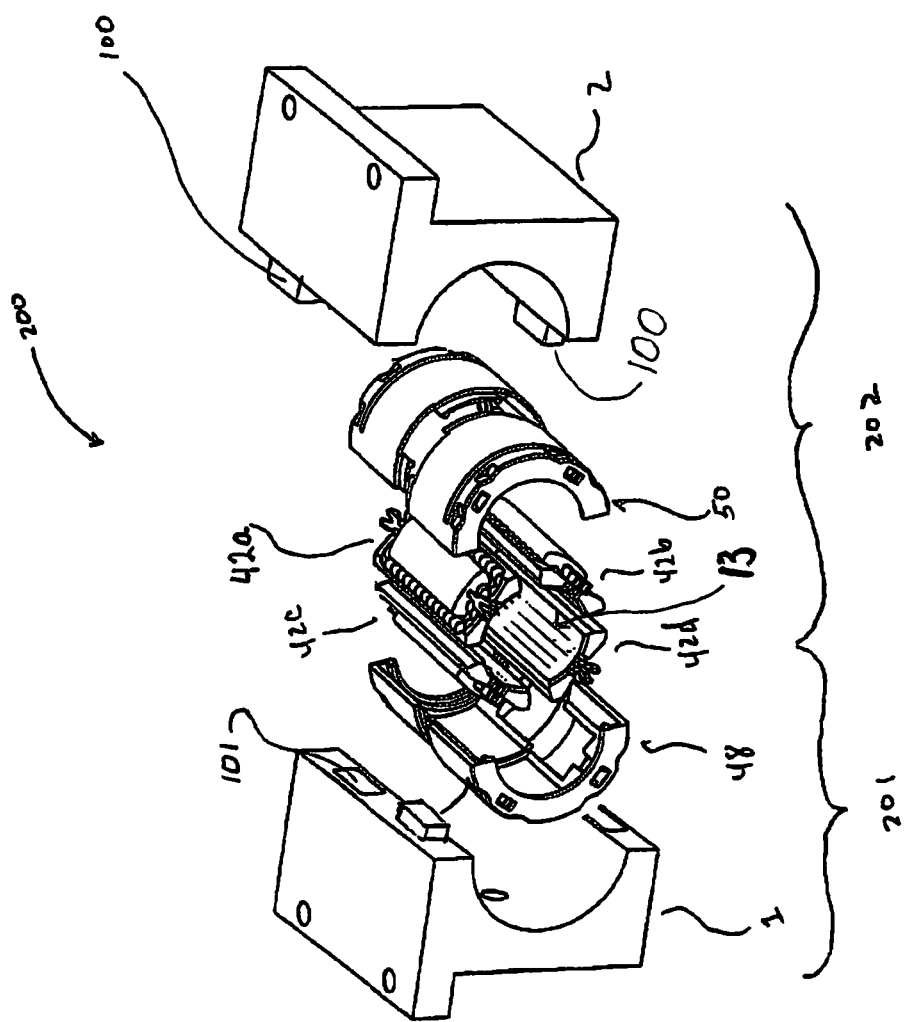
FIG. 6 is an exploded perspective view of a hybrid clam shell linear motion bearing assembly in accordance with another embodiment of the present invention.

The load bearing structures 42 include two retainer segments 55a and 55b which do not comprise roller balls. Rather, they each include a low friction sliding surface 58 which may optionally be smooth or may optionally have lateral and/or lengthwise ribs and/or channels 13 (FIG. 6). The surface 58 can be fabricated from a low friction material polymeric materials such as, for example, polytetrafluoroethylene (PTFE), available under the name Teflon® or acetal resin available commercially under the name Delrin®. Alternatively, surface 58 can comprise an abrasion resistant metal with a dry lubricant (e.g., graphite, hexagonal boron nitride, molybdenum disulfide, etc.), or a fluid lubricant such as any of the available mineral oils, synthetic oils, or silicones suitable for the purposes described herein.

The linear motion bearing assembly in accordance with one preferred embodiment includes a pair of outer housing sleeves 48, 50 which, when assembled serve to surround and contain the load bearing plate structures 42. Preferably, outer housing sleeves 48, 50 are identical in configuration and are configured such that any one outer housing sleeve can securely mate with any other outer housing sleeve. Preferably, each of sleeves 48, 50 are molded from an engineering plastic to facilitate ease of manufacture and assembly. However, one skilled in the art will appreciate that, when operating conditions or specific applications require, the sleeves can be made in differing configurations and/or from engineering metals.

The outer radial surface 74 of sleeves 48, 50 are preferably of a smooth cylindrical shape and are configured and dimensioned to fit within bearing blocks 1, 2. The inner radial surface 76 of sleeves 48, 50 include mounting surfaces 78 which are configured to receive at least a portion of load bearing plates 44 therein.

In this embodiment of the present invention, mounting surfaces 78 are configured to fit the shape of individual ball retainer segments 55a and 55b. A plurality of locking bores 82 are formed in respective ends of sleeves 48, 50 in alignment with locking clips 72 of segments 54a and 54b, 55a and 55b. Thus, when the segments 54a, 54b, 55a and 55b are assembled into the sleeves 48, 50, locking clip 72 extends into respective locking bores 82 and assists in holding linear motion bearing assembly 40 together.

Referring also to FIGS. 1, 2 and 5, a plurality of individual load bearing plates 44 are incorporated into the linear motion bearing assembly 40 and serve to receive load from the shaft 70. Load bearing plate 44 is elongated along the longitudinal axis of the bearing assembly and includes an outer radial surface 84, an inner radial surface 86, and a pair of side wall surfaces 88. The outer radial surface 84 is substantially arcuate and, in a preferred embodiment, includes a crown portion 90 disposed on the outer radial surface 84 in a medial position. Crown portion 90 is configured and dimensioned to permit the load bearing plates to rock both circumferentially and longitudinally into and out of parallelism with the axes of the ball retainer 42.

The inner radial surface 86 of the load bearing plate of this embodiment is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load beating capacity.

This embodiment of the present invention, a longitudinal groove 92 is formed in each side wall surface 88 of load bearing plates 44. These grooves 92 make up a side wall of the axial ball tracks 60 and guide bearing balls 46 as they move through the return portion thereof.

Figure 7:
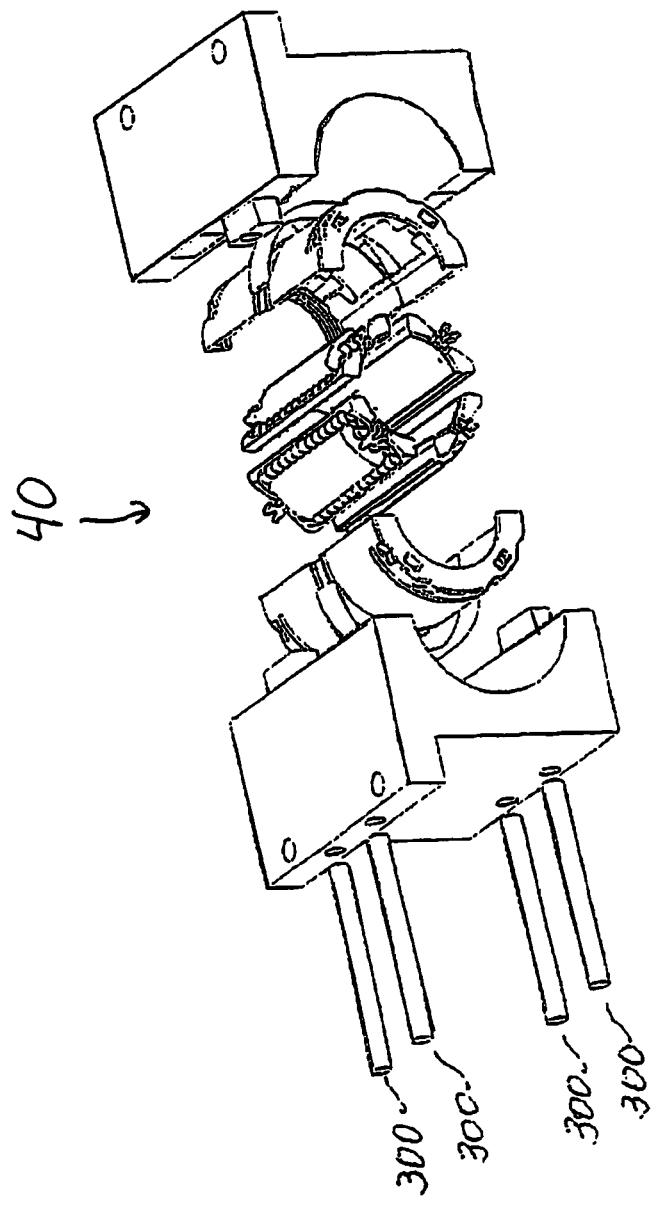
FIG. 7 is an exploded perspective view of the hybrid clam shell linear motion bearing assembly in accordance with an embodiment of the invention.
Figure 7:
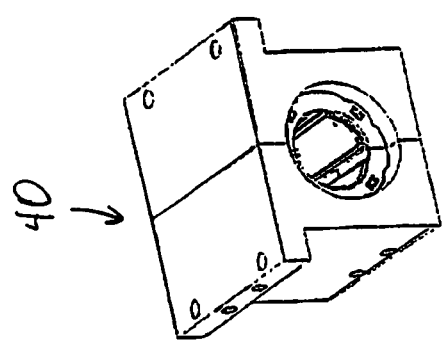
Figure 8:
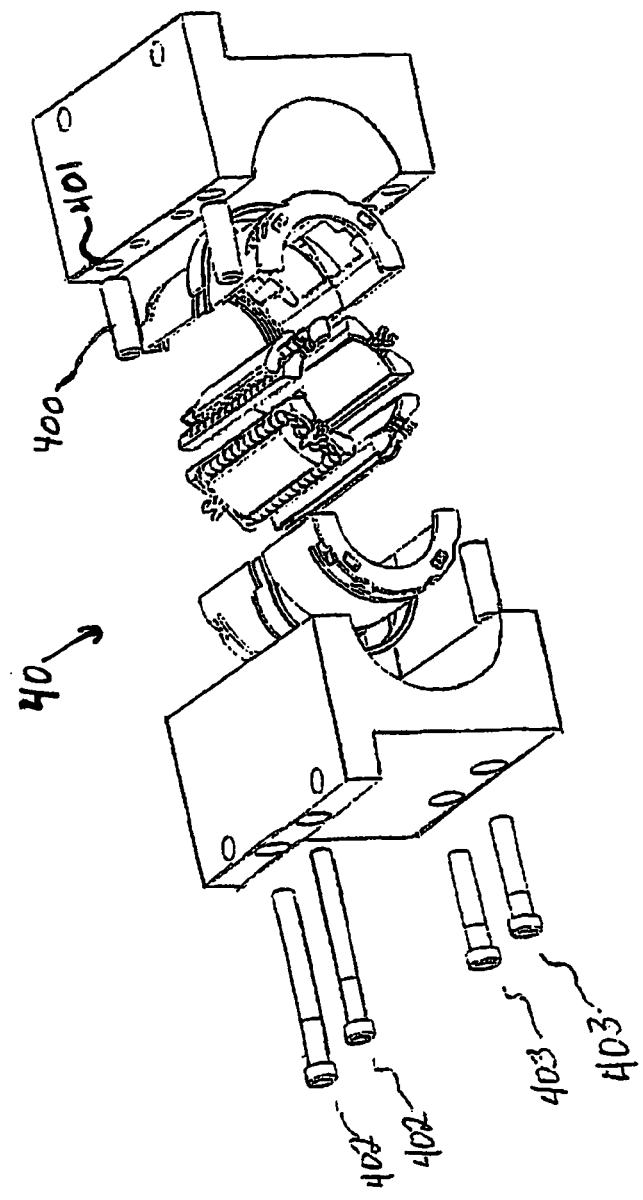
FIG. 8 is an exploded perspective view of the hybrid clam shell linear motion bearing assembly in accordance with an embodiment of the invention.

Bearing blocks 1, 2 are illustrated having an inner radial surface 94 conforming substantially in dimension to the outer radial surface 74 of sleeves 48, 50. Bearing blocks 1, 2 have a plurality of mortises 101 and tenons 100 that interlock with each other. That is, a male portion (100) that fits within a female portion (101) to interlock. The configuration of the mortises 101 and tenons 100 can vary, for example, the mortises 101 and tenons 100 can be configured such that each bearing block is identical and can mate with each other bearing block. One such example is shown in FIG. 6. Tie rod holes 102 can be bored through each bearing block and can be used to provide additional strength to the bearing blocks 1, 2 to prevent the bearing blocks 1, 2 from opening. FIGS. 7 and 8 illustrate other designs for interlocking bearing blocks 1,2.

In FIG. 7, tension rods 300 provide secure interlocking. Each tension rod can be inserted through the assembled bearing blocks 1,2. The tension rods can be threaded and nuts applied to each end to secure the bearing blocks 1, 2 in place. In FIG. 8, dowel pins 400 are used to interlock bearing blocks 1, 2. Dowel pins 400 are inserted into holes 401. Holes 401 are located on the interior mating surfaces of each bearing block 1,2 and one dowel pin is used for two mating holes. In addition, cap screws 402, 403 can be used in place of tension rods 300. A threaded end of each cap screw is inserted into bearing blocks 1, 2. Nuts (not shown) can be used to secure cap screws 402, 403. Also, bearing blocks 1, 2 can include threads to secure cap screws 402, 403. Although the configuration illustrated in FIG. 8 show all cap screws entering from one side of bearing blocks 1, 2, a configuration wherein two alternating cap screws can be inserted into each bearing block to create two identical halves (i.e. no left or right halves) consisting of one bearing block and two cap screws. Other systems for interlocking bearing blocks 1, 2 are contemplated.

The bearing blocks 1, 2 are preferably formed of a hard abrasion resistant material such as, for example, stainless steel or ceramic. Alternatively, a softer material such as bronze or aluminum may also be used.

FIG. 6 illustrates a hybrid clam shell linear motion bearing assembly according to another embodiment of the present invention. As shown in FIG. 6, bearing blocks 1, 2, sleeves 48, 50 and load bearing plate structures 42a, 42b, 42c, 42d are aligned along a horizontal axis thus creating structures defined along the vertical axis. First load bearing plate structures 42a and 42b include ball bearings as described above. Second load bearing plate structures 42c and 42d do not include ball bearings, but rather include inner surfaces 58 for sliding contact with a support shaft 70 (FIG. 5) Thus, bearing block 1, sleeve 48 and load bearing plate structures 42c, 42d form one-half 201 of the hybrid clam shell linear motion bearing assembly 200, and bearing block 2, sleeve 50 and load bearing plate structures 42a, 42b form another half 202 of the hybrid clam shell linear motion bearing assembly 200. Halves 201, 202 are configured to interlock with each other.

It is also envisioned that various seals and/or wiper structure will be incorporated into the bearing assembly to inhibit the ingress of dust, dirt or other contaminants. See, for example, U.S. Pat. No. 3,545,826 to Magee et al., the disclosure of which is incorporated herein by reference.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A linear motion bearing assembly, comprising:
  a) first and second interlocking bearing blocks, each having an inner wall which together define an axial space;
  b) a load bearing assembly disposed within the axial space of the interlocking bearing blocks, said load bearing assembly including
    (i) first and second joinable sleeves,
    (ii) two first load bearing structures disposed within the joined sleeves and each including an inner surface and tracks for ball bearings, and
    (iii) two second load bearing structures disposed within the joined sleeves and each including an inner low friction surface material which includes one or more of polytetrafluoroethylene, acetal resin, a metal with a dry lubricant selected from graphite, hexagonal boron nitride, and molybdenum disulfide, or a fluid lubricant which comprises a mineral oil, synthetic oil or silicone,
  said second load bearing structures in sliding contact with a circular shaft, the inner surfaces of said first and second load bearing structures together defining an axial circular channel through which the circular shaft is disposed and linearly and/or rotatably movable therein,
  with the individual first and second load bearing structures together defining a polygonally-shaped load bearing structure having a circular bore therethrough for receiving the shaft,
  the first load bearing structures (54a, 54b) and the second load bearing structures (55a, 55b) circumferentially arranged around the circular shaft (70), and
  the second load bearing structures (55a, 55b) arranged in a first circumferential half underneath the first load bearing structures (54a, 54b) which are circumferentially mounted about the shaft (70) in a second circumferential half.

2. The linear motion bearing assembly of claim 1 wherein the first and second sleeves each has at least one locking bore in an end portion of the respective sleeve.

3. The linear motion bearing assembly of claim 2 wherein the first and second load bearing structures each has at least one locking clip configured to be engagable with a respective locking bore of a respective one of the first and second sleeves.

4. The linear motion bearing assembly of claim 1 additionally comprising load bearing plates for mounting upon the first load bearing structures, with each said load bearing plate having an outer surface with a crown portion in a medial position, the crown portion having a smaller radius of curvature than the outer surface of the load bearing plate, the crown portion being configured to permit the load bearing plate to rock into and out of parallelism with the axis of the axial space.

5. The linear motion bearing assembly of claim 1 wherein the first load bearing structures each include on an outer radial surface thereof, a pair of open ball tracks arranged in parallel side by side orientation and longitudinally aligned with the axis of the axial channel, the ball bearings being movably disposed within said tracks.

6. The linear motion bearing assembly of claim 1 wherein the inner low friction surface of the second load bearing structures comprises a low friction polymer.

7. The linear motion bearing assembly of claim 6 wherein the low friction polymer is selected from polytetrafluoroethylene and acetal resin.

8. The linear motion bearing assembly of claim 1 wherein the inner low friction surface of the second load bearing surface comprises the metal with a dry lubricant selected from graphite, hexagonal boron nitride, and molybdenum disulfide.

9. The linear motion bearing assembly of claim 1 wherein said linear motion bearing assembly is at least partially constructed from a material selected from the group consisting of High Density Polyethylene plastic (HDPE), Ultra high Molecular weight Polyethylene plastic (UHMWPE), MC Cast Nylon 6/66 plastic (Nylon), Polytetrafluoroethylene plastic (PTFE), Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS) and Polyoxymethylene plastic (POM/Acetal).

10. The linear motion bearing assembly of claim 9 wherein the second load bearing structures are each molded from the material selected from the group consisting of High Density Polyethylene plastic (HDPE), Ultra high Molecular weight Polyethylene plastic (UHMWPE), MC Cast Nylon 6/66 plastic (Nylon), Polytetrafluoroethylene plastic (PTFE), Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS) and Polyoxymethylene plastic (POM/Acetal).

11. The linear motion bearing assembly of claim 1 wherein said linear motion bearing assembly is at least partially constructed from a material selected from the group consisting of stainless steel, brass, bronze, nickel alloys, aluminum and titanium.

12. The linear motion bearing assembly of claim 1 wherein the low friction surface of the second load bearing structures is without lateral or lengthwise ribs or channels.

13. The linear motion bearing assembly of claim 1 wherein the low friction surface of the second load bearing structures includes lateral or lengthwise ribs or channels.

14. The linear motion bearing assembly of claim 1 wherein the bearing blocks include interlocking mortises and tenons.

15. The linear motion bearing assembly of claim 1 further including tension rods wherein the bearing blocks each include holes extending through said bearing blocks configured to receive said tension rods.

16. The linear motion bearing assembly of claim 1 further including dowel pins wherein the bearing blocks include holes in mating interior surfaces configured to receive said dowel pins.

17. The linear motion bearing assembly of claim 1 wherein the second load bearing structures contact the shaft only via the inner low friction surface material.

18. The linear motion bearing assembly of claim 1 additionally comprising ball bearings positioned in the tracks of the first load bearing structures.

19. The linear motion bearing assembly of claim 1, wherein the second load bearing structures contact the shaft only via the inner low friction surface material.

* * * * *